(12) United States Patent
Kimura

(10) Patent No.: US 6,552,138 B1
(45) Date of Patent: Apr. 22, 2003

(54) RESIN FOR FLEXIBLE SEALED CONTAINERS AND CONTAINERS

(75) Inventor: Tomohiko Kimura, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/719,643

(22) PCT Filed: Apr. 16, 1999

(86) PCT No.: PCT/JP99/02036

§ 371 (c)(1),
(2), (4) Date: Dec. 15, 2000

(51) Int. Cl.⁷ .............................. C08F 4/42; C08F 210/00
(52) U.S. Cl. ........................ 526/160; 526/943; 526/158; 526/129; 526/352; 526/348; 525/240
(58) Field of Search ................................. 526/160, 943, 526/158, 129, 352, 348; 525/240

(56) References Cited

U.S. PATENT DOCUMENTS 5,663,236 A * 9/1997 Takahashi et al. .......... 525/240

FOREIGN PATENT DOCUMENTS

| JP | 6-206939 | 7/1994 |
| JP | 6-207056 | 7/1994 |
| JP | 6-207059 | 7/1994 |
| JP | 10-25355 | 1/1998 |

OTHER PUBLICATIONS

Arie Ram, Fundamentals of Polymer Engineering, Plenum Press (1997), pp. 125–136.*

* cited by examiner

*Primary Examiner*—David W. Wu
*Assistant Examiner*—Ling-Siu Choi
(74) *Attorney, Agent, or Firm*—Birch, Stewart, Kolasch & Birch, LLP

(57) ABSTRACT

A resin which is an ethylene/α-olefin copolymer comprising ethylene and an α-olefin having 3 to 12 carbon atoms exhibiting particular physical properties including a narrow molecular weight distribution, and which is suitable for flexible sealed containers showing excellent flexibility, unstickiness and excellent slip properties, and flexible sealed containers therefrom.

3 Claims, No Drawings

RESIN FOR FLEXIBLE SEALED CONTAINERS AND CONTAINERS

This application is the national phase under 35 U.S.C. §371 of PCT International Application No. PCT/JP99/02036 which has an International filing date of Apr. 16, 1999, which designated the United States of America.

TECHNICAL FIELD

The present invention relates to a polyethylene type resin for flexible sealed containers and flexible sealed containers obtained therefrom.

TECHNICAL BACKGROUND

Because of their excellent transparency, flexibility, strength and moisture resistance, those sealed containers produced by injection-molding polyethylene are used widely as molded containers for preserving food.

In recent years, under the background of the necessity for preserving the contents of containers such as food at low temperatures, there is an increasingly great demand for those sealed containers which show a higher degree of flexibility than that of the conventional sealed containers.

As the material of such sealed containers, linear very low density polyethylene and high-pressure low density polyethylene are used utilizing those particular properties. However, it has been found that a problem arises when such polyethylene is blended with another resin or a plasticizer to improve its flexibility because the sealed containers obtained from such blended polyethylene will tend to have higher flexibility but become sticky and decline in slip properties.

For this reason, the inventor of the invention set a target of supplying a resin for flexible sealed containers that can provide sealed containers having higher flexibility than that of conventional sealed containers and yet excellent slip properties that are free of stickiness.

The present invention is intended to resolve such problem accompanied by conventional technology as described above. The purpose of the invention is to provide a resin for flexible sealed containers that can manufacture sealed containers which have higher flexibility than that of conventional sealed containers and exhibit unstickiness and excellent slip properties.

DISCLOSURE OF THE INVENTION

The resin for flexible sealed containers of the present invention is an ethylene/α-olefin copolymer (A) comprising ethylene and an α-olefin having 3 to 12 carbon atoms, with the said ethylene/α-olefin copolymer (A) being a polyethylene resin which shows:

(1) Density ranging from 0.900 to 0.930 g/cm$^3$;

(2) Melt flow rate ranging from 0.1 to 100 g/10 min.;

(3) Content of the component soluble in n-decane at normal temperature which ranges from 0.1 to 2 wt %;

(4) Molecular weight distribution (Mw/Mn) as measured by GPC which ranges from 1.5 to 3.5; and (5) Olsen rigidity ranging from 500 to 3,500 g/cm$^2$.

The resin for flexible sealed containers of the present invention is an ethylene/α-olefin copolymer (A) comprising ethylene and an α-olefin having 3 to 12 carbon atoms. This ethylene/α-olefin copolymer (A) may be of a straight-chain type or a branched (short-chain/long-chain branched) type.

Specific examples of the α-olefin having 3 to 12 carbon atoms include propylene, 1-butene, 1-pentene, 1-hexene, 4-methyl-1-pentene, 1-octene, 1-decene and 1-dodecene. More preferable examples of the α-olefin are those α-olefins having 3 to 8 carbon atoms such as propylene, 1-butene, 1-pentene, 1-hexene, 4-methyl-1-pentene and 1-octene.

Therefore, a more preferable ethylene/α-olefin copolymer (A) is an ethylene/α-olefin copolymer (A) comprising ethylene and an α-olefin having 3 to 8 carbon atoms.

Preferable examples of the ethylene/α-olefin copolymer (A) of the invention are ethylene/1-butene copolymer, ethylene/1-pentene copolymer, ethylene/1-hexene copolymer, ethylene/4-methyl-1-pentene copolymer and ethylene/1-octene copolymer.

This ethylene/α-olefin copolymer (A) contains 65 to 99 wt %, preferably 70 to 98 wt %, more preferably 75 to 96 wt %, of the component unit derived from a ethylene and 1 to 35 wt %, preferably 2 to 30 wt %, more preferably 4 to 25 wt %, of the component unit derived from the α-olefin having 3 to 12 carbon atoms.

The density of the ethylene/α-olefin copolymer (A) is in a range of 0.900 to 0.930 g/cm$^3$, preferably 0.900 to 0.920 g/cm$^3$. The ethylene/α-olefin copolymer (A) having density in this range makes the molding of sealed containers having adequate mechanical strength and flexibility possible.

Furthermore, the melt flow rate of the ethylene/α-olefin copolymer (A) is in a range of 0.1 to 100 g/10 min., preferably 1 to 90 g/10 min., more preferably 10 to 80 g/10 min. The use of the ethylene/α-olefin copolymer (A) showing the melt flow rate in the above range enables injection-molding to be carried out efficiently and containers retaining high mechanical strength to be molded.

Moreover, the content (W) of the component soluble in n-decane at normal temperature is in a range of 0.1 to 2 wt %, preferably 0.1 to 1.0 wt %.

The content (W) of the component soluble in n-decane can be defined by the following formula:

W (%)=[(Weight of component soluble in n-decane)/(total weight of components soluble and insoluble in n-decane)]×100

It means that as the content of the component soluble in n-decane decreases, the composition distribution of the ethylene/α-olefin copolymer (A) becomes narrower. It is desirable that the content of the component soluble in n-decane is in the above range because if the content of the component soluble in n-decane is in the above range, the content of the low molecular weight component which causes stickiness is very low, enabling moldings having excellent slip properties to be obtained.

Furthermore, the ethylene/α-olefin copolymer (A) shows a molecular weight distribution (Mw/Mn: Mw=weight average molecular weight; Mn=number average molecular weight) being in a range of 1.5 to 3.5, preferably 1.5 to 3.0, as measured by gel permeation chromatography (GPC). The use of the ethylene/α-olefin copolymer (A) showing a molecular weight distribution being in the above range makes the manufacture of containers exhibiting low stickiness possible.

Furthermore, in the invention, the Olsen rigidity of the ethylene/α-olefin copolymer (A) is in a range of 500 to 3,500 g/cm$^2$, preferably 500 to 3,000 g/cm$^2$. The moldings obtained from this resin show excellent flexibility because its Olsen rigidity is in the above range.

Those moldings also have excellent Izod impact strength and do normally not fail in Izod impact strength test.

The ethylene/α-olefin copolymer (A) of the invention preferably shows a relationship between melt tension MT (g) at 190° C. and melt flow rate MFR (g/10 min.) as represented by:

$$MT > 2.2 \times MFR^{-0.84} \quad (i)$$

The ethylene/α-olefin copolymer (A) of the invention preferably shows a relationship between content W (wt %) of the component soluble in decane at room temperature and density d (g/cm³) as represented by:

When MFR ≦10 g/10 min., $$W < 80 \times \exp(-100(d - 0.88)) + 0.1 \quad (ii\text{-}a)$$

When MFR >10 g/10 min., $$W < 80 \times (MFR-9)^{0.26} \times \exp(-100(d-0.88)) + 0.1 \quad (ii\text{-}b)$$

The ethylene/α-olefin copolymer (A) of the present invention preferably shows a relationship between temperature Tm (° C.) at the highest peak in the endothermic curve as measured with a differential scanning calorimeter (DSC) and density (d) as represented by:

$$Tm < 400d - 248 \quad (iii)$$

The ethylene/α-olefin copolymer (A) of the invention most preferably shows the relationships as represented by (i), (ii-a) or (ii-b), and (iii) above simultaneously.

The ethylene/α-olefin copolymer (A) of the invention much more preferably shows additionally a relationship between flow index FI (1/sec) as defined in terms of the shear rate at which the shear stress at 190° C. of the molten polymer reaches $2.4 \times 10^6$ dyne/cm² and melt flow rate MFR (g/10 min) which is represented by:

$$FI > 75 \times MFR \quad (iv)$$

Such ethylene/α-olefin copolymer (A) can be manufactured, for example, by copolymerizing ethylene and α-olefin in the presence of an olefin polymerization catalyst comprising a compound (a) of a transition metal in Group IV of the Periodic Table which contains the cyclopentadienyl skeleton, an organo-aluminum oxy compound (b), a carrier (c), and as required an organo-aluminum compound (d).

Given below is an explanation of such olefin polymerization catalyst and each of the catalyst components.

Transition Metal Compound (a)

The compound (a) of a transition metal in Group IV of the Periodic Table which contains the cyclopentadienyl skeleton is specifically a transition metal compound as represented by the following formula (I):

$$ML^1_x \quad (I)$$

(wherein M represents a transition metal selected from Group IV of the Periodic Table; $L^1$ represents the ligands coordinated to the transition metal atom, at least two of which are preferably a substituted cyclopentadienyl group, particularly the cyclopentadienyl group having 2 to 5 substituent groups alone selected from methyl group and ethyl group; with the ligands $L^1$ other than the substituted cyclopentadienyl being a hydrocarbon group having 1 to 12 carbon atoms, alkoxy group, aryloxy group, halogen atom, trialkylsilyl group or hydrogen atom; and X represents the valence of the transition metal atom M.)

Examples of such transition metal compound (a) as represented by Formula (I) include bis(dimethylcyclopentadienyl)zirconium-dichloride, bis(diethylcydo-pentadienyl)zirconium-dichloride, bis(methylethylcyclopentadienyl)zirconium-dichloride, bis(dimethylethylcyclopentadienyl)zirconium-dichloride, bis(dimethylcydopentadienyl)zirconiumdibromide, bis(dimethylcyclopentadienyl)zirconium-methoxychloride, bis(dimethylcyclopentadienyl)zirconiumethoxychloride, bis(dimethylcydopentadienyl)zirconiumbutoxychloride, bis(dimethylcyclopentadienyl) zirconiumdiethoxide, bis(dimethylcyclopentadienyl)zirconiummethylchloride, bis(dimethylcyclopentadienyl)zirconiumdimethyl, bis(dimethylcyclopentadienyl) zirconiumbenzylchloride, bis(dimethylcyclopentadienyl)zirconiumdibenzyl, bis(dimethylcydopentadienyl)zirconiumphenylchloride, and bis(dimethylcyclo-pentadienyl)zirconiumhydridechloride. Further, in the above examples, the di-substitution product of the cyclopentadienyl ring includes 1,2- and 1,3-substitution products, and its tri-substitution product includes 1,2,3- and 1,2,4-substitution products.

In the present invention, a transition metal compound whose zirconium metal has been replaced with titanium metal or hafnium metal may be used in the zirconium compounds as listed above.

Out of these transition metal compounds represented by Formula (I), bis(1,3-dimethylcyclopentadienyl) zirconiumdichloride, bis(1,3-diethylcyclopentadienyl) zirconiumdichloride, bis(1-methyl-3-ethylcyelopentadienyl) zirconiumdichloride, bis(1-methyl-3-n-butylcyclopentadienyl)zirconiumdichloride and bis(1-methyl-3-n-propylcyclopentadienyl)zirconiumdichloride are especially preferable.

The transition metal compound (a) used in the present invention may be a mixture of a transition metal compound represented by the aforesaid Formula (I) and a transition metal compound represented by Formula (II) shown below. Furthermore, a transition metal compound represented by the following Formula (II) may also be used singly.

$$MKL^2_{x-2} \quad (II)$$

(wherein M represents a transition metal selected from Group IVB of the Periodic Table; K and $L^2$ represents the ligands coordinated to the transition metal atom; the ligand K is a two-seat ligand to which the same or different indenyl group, substituted indenyl group or its partially hydrated product is bonded via the lower alkylene group; the ligand $L^2$ is a hydrocarbon group having 1 to 12 carbon atoms, alkoxy group, aryloxy group, halogen atom, trialkylsilyl group or hydrogen atom; and X represents the valence of the transition metal atom M.)

Specific examples of such transition metal compounds as represented by Formula (II) include ethylene bis(indenyl) zirconiumdichloride, ethylene bis(4-methyl-1-indenyl) zirconiumdichloride, and ethylene bis(4,5,6,7-tetrahydro-1-indenyl)zirconium dichloride.

It is desirable that at least one of transition metal compound (a-1) selected from the transition metal compounds represented by aforesaid Formula (I) and at least one of transition metal compound (a-2) selected from the transition metal compounds represented by aforesaid Formula (II) be used in such amounts that the (a-1)/(a-2) molar ratio will be 99/1 to 50/50, preferably 97/3 to 70/30, more preferably 95/5 to 75/25, most preferably 90/10 to 80/20.

Organoaluminum Oxy Compound (b)

As examples of the organoaluminum oxy compound used in the invention, methylaluminoxane, ethylaluminoxane and isobutylaluminoxane can be cited. This organoaluminum oxy compound may be a benzene-soluble aluminoxane already known to the public or a benzene-insoluble organoaluminum oxy compound as disclosed in Japanese Laid-open Patent application HEI 2-276807.

Carrier (c)

For the carrier (c) used in the present invention, a solid which is an inorganic or organic compound which is in the form of granules or fine particles 10 to 300 $\mu$m, preferably 20 to 200 $\mu$m in particle diameter may be used.

For example, porous oxides are preferable for use as such inorganic carrier. Especially a carrier using as the principal component at least one component selected from the group composed of $SiO_2$ and $Al_2O_3$ is used preferably.

The carrier (c) differs in properties depending on its type and manufacturing process. However, the carrier (c) preferably used in the invention preferably has a specific surface area of 50 to 1,000 $m^2/g$, preferably 100 to 700 $m^2/g$, and a pore volume of 0.3 to 2.5 $cm^2/g$. The carrier (c) is sintered at 100 to 1000° C., preferably 150 to 700° C., as required before use.

Organo-aluminum Compound (d)

Specific examples of the organo-aluminum compound (d) used as required include trialkyl aluminum such as trimethyl aluminum, triethyl aluminum, triisopropyl aluminum, triisobutyl aluminum, trioctyl aluminum and tri2-ethylhexyl aluminum; alkenyl aluminum; dialkyl aluminum halide such as dimethyl aluminum chloride, diethyl aluminum chloride, diisopropyl aluminum chloride, diisobutyl aluminum chloride, and dimethyl aluminum bromide; alkyl aluminum sesquihalide; alkyl aluminum dihalide; alkyl aluminum hydride; and dialkyl aluminum alkoxide such as dimethyl aluminum methoxide, diethyl aluminum ethoxide and diisobutyl aluminum methoxide.

An organic boron compound may be used in place of the organo-aluminum compound.

In mixing and bringing into contact the transition metal compound (a), organioaluminum oxy compound (b), carrier (c) and as required organo-aluminum compound (d), the transition metal compound (a) is used in an amount of normally $5 \times 10^{-6}$ to $5 \times 10^{-4}$ mol, preferably $10^{-5}$ to $2 \times 10^{-4}$ mol per/g of the carrier (c), with the concentration of the transition metal compound (a) being in a range of approx. $10^{-4}$ to $2 \times 10^{-2}$ mol/liter, preferably $2 \times 10^{-4}$ to $10^{-2}$ mol/liter. The atomic ratio (Al/transition metal) between the aluminum in the organoaluminum oxy compound (b) and the transition metal in the transition metal compound (a) is normally 10 to 500, preferably 20 to 200. The atomic ratio (Al-d/Al-b) between the aluminum atom (Al-d) of the organo-aluminum compound (d) used as required and the aluminum atom (Al-b) of the organoaluminum oxy compound (b) is in a range of normally 0.02 to 3, preferably 0.05 to 1.5.

In the present invention, the copolymerization of ethylene and $\alpha$-olefin is carried out in the gas phase or in the liquid phase in the slurry state. In slurry polymerization, inactive hydrocarbon may be used as the solvent, or the olefin itself may be used as the solvent.

In carrying out the copolymerization by the slurry polymerization process or the gas-phase polymerization process, the olefin polymerization catalyst as described above is preferably used at a transition metal concentration in the polymerization reaction system of normally $10^{-8}$ to $10^{-3}$ gram atom/liter, preferably $10^{-7}$ to $10^{-4}$ gram atom/liter.

In carrying out the copolymerization by the slurry polymerization method, the polymerization temperature is in a range of normally −50 to 100° C., preferably 0 to 90° C.; and in carrying out the copolymerization by the gas-phase polymerization method, the polymerization temperature is in a range of normally 0 to 120° C., preferably 20 to 100° C.

Polymerization pressure is normally at normal pressure to a pressurized level of 100 kg/$cm^2$, preferably 2 to 50 kg/$cm^2$, and the polymerization may be conducted by any of the batch, semicontinuous and continuous methods.

Furthermore, it is also possible to conduct the polymerization in two stages in which reaction conditions are different, and it is possible to speed up the polymerization reaction in a single stage or a multiple stage, including prepolymerization step.

Other Components

The resin for flexible sealed containers of the present invention is the ethylene/$\alpha$-olefin copolymer (A) manufactured by a method described above. And additives such as weathering stabilizers, heat stabilizers, antistatic agents, slip agents, antiblocking agents, antifogging agents, lubricators, pigments, nucleating agents, plasticizers, age resistors, hydrochloric acid absorbers and antioxidants may be added to the ethylene/$\alpha$-olefin copolymer (A) as required to such extent that the purpose of the present invention is not thwarted.

Sealed Containers

The resin of the invention which comprises the aforesaid ethylene/$\alpha$-olefin copolymer (A) allows flexible sealed containers to be produced by injection molding under normal conditions.

These moldings have the characteristic of showing an Olsen rigidity of 500 to 3,500 g/$cm^2$ as measured by a method based on ASTM D-747, which is lower than that of conventional polyethylene moldings, but exhibiting higher flexibility than that of conventional polyethylene moldings. Furthermore, these moldings retain adequate flexibility and mechanical strength even at low temperatures. In the Examples described below, the samples did not fail when tested for Izod impact strength at 0° C. In addition, the moldings are molded articles which show a low coefficient of friction and are not sticky.

Consequently, the moldings of the invention can be used satisfactorily as sealed containers for various foods including processed liquid foods and sealed containers for non-food products such as pharmaceuticals. The moldings can also be used as bag-in-boxes. Since the moldings retain adequate flexibility and mechanical strength even at low temperatures as mentioned above, they can also be used as freezing and refrigerating containers.

Further, the evaluation of the physical properties of the resin and moldings of the invention was performed by the following methods:

(1) Izod impact strength:

Izod impact test was conducted in an atmosphere at 0° C. by a method based on ASTM D 256 (with notch) to determine Izod impact strength.

(2) Olsen rigidity:

The Olsen rigidity was determined by conducting tensile test by a method based on ASTM D 747.

(3) Coefficient of static friction (slip properties):

The coefficient of static friction was determined under the condition of the testing table temperature being at 50° C. in accordance with JIS K 7125.

(4) Density:

The density was determined with a density gradient tube after heat-treating a strand, which was obtained at the time of measuring the melt flow rate (MFR), under a load of 2.16 kg at 190° C. at 120° C. for 1 hr and gradually cooling it to the room temperature in 1 hr.

(5) Molecular weight distribution:

The molecular weight distribution (Mw/Mn) as determined by means of GPC-150 available from Millipore as described below.

The separating column was TSK GNH HT. The column size was 72 mm in diameter and 600 mm in length, and the column temperature was 140° C. Using o-dichlorobenzene (available from Wako Pure Chemical Industries) as the mobile phase and 0.025 wt % of BHT (available from Takeda Chemical Industries) as an antioxidant, the sample was moved at 1.0 ml/min. The sample concentration was 0.1 wt %, the sample injection amount was 500 microliters, and a differential refractometer was used as the detector. As the standard polyethylene resins, polyethylene resins available from Tosoh Corporation were used for the standard polyethylene resins showing a molecular weight of $Mw<1000$ and $Mw>4\times10^6$, and polyethylene resin available from Pressure Chemical was used for the standard polyethylene resin showing a molecular weight of $1000<Mw<4\times10^6$.

(6) Content of the component soluble in n-decane:

The aforesaid content (W) of the component soluble in n-decane at normal temperature was measured by dissolving approximately 3 g of the copolymer at 145° C. by adding it to 450 ml of n-decane, cooling the solution to 23° C., removing insolubles in n-decane through filtration, and recovering the solubles in n-decane from the filtrate.

(7) Melt flow rate (MFR):

The melt flow rate was measured under a load of 2.16 kg at 190° C. by a method based on ASTM D 1238.

(8) Composition of the ethylene/α-olefin copolymer (A):

The composition of the ethylene/α-olefin copolymer (A) was determined by measuring the $^{13}$C-NMR spectrum of the sample obtained normally by dissolving approximately 200 mg of the ethylene/α-olefin copolymer homogeneously in 1 ml of hexachlorobutadiene in a test tube 10 mm in diameter at a measurement temperature of 120° C., frequency of 25.05 MHz, spectrum width of 1,500 Hz, pulse repeating time of 4.2 sec and pulse width of 6 μsec as the conditions.

EXAMPLE

In the following examples are described several preferred embodiments to illustrate the invention. However, it is to be understood that the invention is not intended to be limited to the specific embodiments.

Example 1

Preparation of the Catalyst 10 kg of the silica previously dried for 10 hr at 250° C. were brought into a suspended state with 154 liters of toluene and then cooled to 0° C. After that, 57.5 liters of a toluene solution (Al=1.33 mol/liter) of methylaminooxane were dropped in 1 hr. During that time, the temperature in the system was kept at 0° C.

That was followed by reaction caused to occur at 0° C. for 30 min. After that, the temperature was raised to 95° C. in 1.5 hr, and reaction was allowed to continue at 95° C. for 20 hr. Subsequently, the temperature was lowered to 60° C., and the supernatant liquid was removed by the decantation method. The solid matter thus obtained was washed with toluene twice and then brought again into a suspended state with 100 liters of toluene.

16.8 liters of a toluene solution (Zr=27.0 millimol/liter) of bis(1,3-dimethyl-cyclopentadienyl)zirconium dichloride were dropped at 80° C. in 30 min and caused to react at 80° C. for 2 hr. After that, the supernatant liquid was removed and washed twice with hexane. As a result, a solid catalyst containing 3.5 mg/g of zirconium was obtained.

Preparation of a prepolymerization catalyst

A prepolymerization catalyst with containing 10 g of prepolymerized polyethylene per g of the solid catalyst was obtained by adding 870 g of the solid catalyst obtained as described above and 260 g of 1-hexane to 87 liters of hexane containing 2.5 mol of triisobutyl aluminum and carrying out the prepolymerization of ethylene at 35° C. for 5 hr.

Polymerization

The copolymerization of ethylene and 1-hexene was carried out at a total pressure of 20 kg/cm$^2$ G and a polymerization temperature of 80° C., using continuous fluidized-bed gas-phase polymerization equipment. The prepolymerization catalyst prepared as described above and triisobutyl aluminum were continuously added in the amount of 0.33 millimol/hr as zirconium atom and at a rate of 10 millimol/hr respectively, and ethylene, 1-hexene, hydrogen and nitrogen were continuously added during the polymerization to maintain a specified gas composition (gas composition: 1-hexene/ethylene =0.023; hydrogen/ethylene=$12.4\times10^{-4}$; and ethylene concentration=70%).

The yield of the ethylene/1-hexene copolymer (A-1) obtained as described above was 60 kg/hr. The ethylene/1-hexene copolymer (A-1) showed density being 0.915 g/cm$^3$, MFR being 15 g/10 min, content of the component soluble in n-decane at normal temperature (23° C.) being 0.8 wt %, and Mw/Mn being 2.9.

These physical properties are shown in Table 1.

In addition, the aforesaid ethylene/1-hexene copolymer (A-1) was pelletized by use of an extruder. The pellets thus obtained were injection-molded at a resin temperature of 200° C. and a mold temperature of 40° C. as the conditions to form ASTM test specimens, which were put to the Izod impact test as defined above. A press-molded sheet was prepared and used in the determination of the Olsen rigidity strength.

The results of the tests are shown in Table 1.

Furthermore, a film 200 μm in thickness was obtained by forming it from the ethylene/1-hexene copolymer (A-1) by use of a cast film forming machine available from Modern at a cylinder temperature of 180 to 220° C., a die temperature of 220° C. and a roll temperature of 30° C. The coefficient of static friction of the film thus obtained was determined by the method as described above. Furthermore, a press-molded sheet was prepared and used in the determination of the Olsen rigidity strength.

The results of the tests are shown in Table 1.

Example 2

Preparation of the Catalyst

The polymerization catalyst was obtained by carrying out the same manner as described in Example 1 except that 3.2 liters of the toluene solution (Zr: 28.1 millimol/liter) of bis(1,3-dimethylcydopentadienyl)zirconium dichloride and 10.7 liters of the toluene solution (Zr: 34.0 millimol/liter) of bis(1,3-n-butylmethyl-cyclopentadienyl)zirconium dichloride were used in place of the toluene solution (Zr =27.0 millimol/liter) of bis(1,3-dimethyl-cyclopentadienyl) zirconium dichloride.

Polymerization

The ethylene/1-hexene copolymer (A-2) was obtained by carrying the same manner as described in Example 1 except that the copolymer was so prepared that its density and MFR would be as shown in Table 1 and that the aforesaid polymerization catalyst was used. The physical properties of the ethylene/1-hexene copolymer (A-2) thus obtained are shown in Table 1.

The Izod impact strength, Olsen rigidity and coefficient of static friction were determined by the same manner as described in Example 1.

The results of the tests are shown in Table 1.

Comparative Example

The Izod impact strength, Olsen rigidity and coefficient of static friction of the ethylene/1-butene copolymer (A-3) manufactured by use of a conventional titanium-based catalyst were determined by the same manner as described in Example 1.

The results of the tests, together with the physical properties of the ethylene/1-butene copolymer (A-3) are shown in Table 1.

TABLE 1

|  |  | Example 1 | Example 2 | Comparative Example |
|---|---|---|---|---|
| Copolymer |  | A-1 | A-2 | A-3 |
| Comonomer | Type | 1-Hexene | 1-Hexene | 1-Butene |
|  | Content (mol %) | 2.5 | 2.6 | 2.5 |
| Density (r/cm³) |  | 0.915 | 0.915 | 0.922 |
| MFR (g/10 min) |  | 15 | 17 | 15 |
| Content of component soluble in n-decane (wt %) |  | 0.8 | 0.8 | 6.5 |
| Mw/Mn |  | 2.9 | 2.6 | 4.0 |
| Izod impact strength (0° C.) (J/m) |  | DNB | DNB | DNB |
| Olsen rigidity (23° C.) (g/cm²) |  | 1500 | 1500 | 3000 |
| Coefficient of static friction (50° C.) |  | 3.0 | 3.0 | 5.0 |
| *1 |  | 3.9 | 4.2 | 2.2 |
| TM (° C.) |  | 115 | 115 | 125 |
| MT (g) |  | 1.0 | 1.0 | 0.3 |
| *2 |  | 0.2 | 0.2 | 0.2 |
| *3 |  | 118 | 118 | 121 |
| FI (S-1) |  | 3200 | — | 4200 |
| *4 |  | 1125 | — | 1125 |

*1 Value of W < 80 × (MFR−9)$^{0.26}$ × exp(−100(d − 0.88)) + 0.1
*2 Value of MT > 2.2 × MFR$^{−0.84}$
*3 Value of Tm < 400 × d − 248
*4 Value of FI > 75 × MFR

APPLICABILITY TO INDUSTRIES

The resin for flexible sealed containers of the present invention provides those flexible sealed containers which have greater flexibility than that of conventional flexible sealed containers and yet show unsticky slip properties.

Since the resin for flexible sealed containers of the present invention relates has the effects as described above, it is suitable for applications for sealed containers such as containers for foods to be frozen and refrigerated for storage, and it is possible to produce flexible sealed containers easily by injection-molding this resin.

What is claimed is:

1. A flexible sealed container comprised of a resin which is an ethylene/α-olefin copolymer (A) comprising ethylene and an α-olefin having 3 to 12 carbon atoms, wherein said container is produced by injection molding and said ethylene/α-olefin copolymer (A) exhibits:

(1) a density ranging from 0.900 to 0.930 g/cm³;
   (2) a melt flow rate determined under load of 2.16 kg at 190° C. which ranges from 10 to 80 g/10 min.;
   (3) a content of components soluble in n-decane at 23° C. which ranges from 0.1 to 2 wt %;
   (4) a molecular weight distribution (Mw/Mn) as measured by GPC which ranges from 1.5 to 3.5; and
   (5) an Olsen rigidity ranging from 500 to 3,500 g/cm².

2. The flexible sealed container according to claim 1, wherein said ethylene/α-olefin copolymer (A) satisfies (1) A relationship between melt tension MT (g) at 190° C. and melt flow rate MFR (g/10 min.) as represented by:
   MT>2.2×MFR$^{−0.84}$
   (2) A relationship between content W (wt %) of the component soluble in decane at 23° C. and density d (g/cm³) as represented by:
   When MFR≦10 g/10 min.,
   W<80×exp(−100(d−0.88))+0.1
   When MFR>10 g/10 min.,
   W<80×(MFR−9)$^{0.26}$×exp(−100(d−0.88))+0.1; and
   (3) A relationship between temperature (Tm (° C.)) at the highest peak in the endothermic curve as measured with a differential scanning calorimeter (DSC) and density (d) as represented by:
   Tm<400×d−248.

3. The flexible sealed container according to claim 1, wherein said ethylene/α-olefin copolymer (A) further satisfies (4) A relationship between flow index (FI (1/sec)) as defined by the shear rate when the shear stress of the molten polymer at a temperature of 190° C. reaches 2.4×10⁶ dyne/cm² and melt flow rate (MFR (g/10 min)) which is represented by:
   FI>75×MFR.

* * * * *